UNITED STATES PATENT OFFICE.

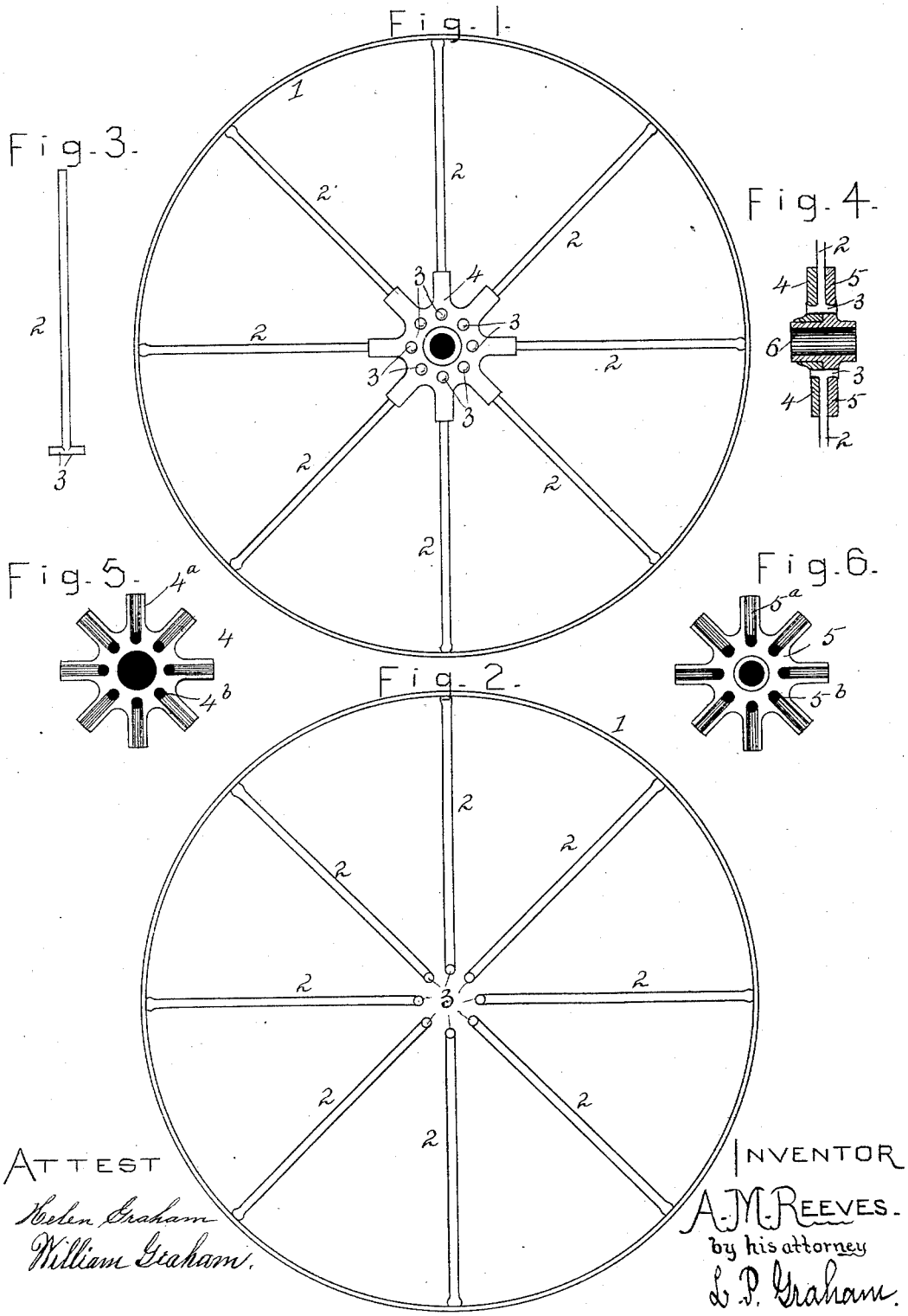

ABBOTT M. REEVES, OF DECATUR, ILLINOIS.

WHEEL.

SPECIFICATION forming part of Letters Patent No. 468,397, dated February 9, 1892.

Application filed September 24, 1891. Serial No. 406,659. (No model.)

*To all whom it may concern:*

Be it known that I, ABBOTT M. REEVES, of Decatur, in the county of Macon and State of Illinois, have invented certain new and useful Improvements in Wheels, of which the following is a specification.

This invention relates to metallic wheels. It is more particularly designed to provide wheels for agricultural implements, as plows, planters, &c.

Its object is to combine strength and durability with comparative cheapness; and it consists in the details of construction and combinations of parts hereinafter set forth and claimed.

In the drawings accompanying and forming a part of this specification, Figure 1 is a side representation of a wheel constructed in accordance with my invention. Fig. 2 is a similar representation of the rim and spokes of such a wheel. Fig. 3 shows a spoke turned to illustrate the T-head with which each spoke is provided. Fig. 4 is a central section through the hub. Fig. 5 is an inner view of one part of the hub, and Fig. 6 is a similar view of the opposite part.

The rim 1 is or may be formed in any desirable manner. The spokes 2 are of wrought or malleable metal, and they each have a T-head 3 on their inner ends. The hub is in two parts 4 and 5. Part 4 has the radial grooves $4^a$, conforming to the spokes, and also has the holes $4^b$, through which parts of heads 3 extend. Part 5 has grooves $5^a$ and holes $5^b$, adapted to coincide with the grooves and holes of part 4, and the holes $5^b$ are also adapted to receive parts of heads 3. The bore 6 of the hub may be made in any desirable manner, though it is thought preferable to construct it as seen in Fig. 4, where the bore is shown entirely in one part, and the opposite part has an enlarged opening, which fits over the boss through which the bore extends.

In constructing the wheel the parts of the hub are placed together with the heads of the spokes extending through the holes of the parts, and the projecting ends of the heads are upset or riveted in the holes. When this is done, the parts of the hub are held together by the spokes. The spokes are held against radial displacement or displacement in the direction of their respective lengths by the firm bearings of the heads in the holes, and are also held against lateral displacement by the grooved radial extensions, which embrace the spokes with a force proportionate to the draw of the riveted heads. The relation of the hub and the spokes one to the other is that of interdependence. The parts of the hub are held together by the spokes. The spokes are held by the hub, and the firmer the parts of the hub are drawn together by the spokes the firmer will the spokes themselves be held. The heads not only effectively prevent radial displacement of the spokes, a matter of much importance in wheels of this class, but they also assist in preventing lateral displacement. The hub is of cast metal, preferably made malleable, and the holes are so constructed as to form continuous bearings against the inner surfaces of the T-heads. When in long-continued use a spoke or spokes become loose in the hub, the defect may easily be remedied by an unskilled person without the use of special tools, it being necessary simply to tighten the rivet ends of the cross-heads by a few blows of a hammer, the result being to shorten the head somewhat and swell it in the holes.

I claim—

1. A wheel in which the spokes have T-heads on their inner ends and the oppositely-projecting ends of such heads extend through separate opposing parts of the hub, as set forth.

2. A wheel in which the spokes have T-heads on their inner ends and the oppositely-projecting ends of such heads extend through and bind together separate opposing parts of the hub, as set forth.

3. A wheel in which the spokes have T-heads on their inner ends and the oppositely-projecting ends of such heads extend through and are riveted in separate opposing parts of the hub, as set forth.

4. In wheels, a hub composed of two parts, each having coinciding radial grooves and holes parallel with the bore, and spokes having T-heads on their inner ends, the inner ends of the spokes lying in the grooves and the T-heads being extended through the holes of the parts of the hub and riveted or upset therein, as set forth.

In testimony whereof I sign my name in the presence of two subscribing witnesses.

ABBOTT M. REEVES.

Attest:
JOHN QUINLAN,
THOS. J. ABEL.